US 10,834,432 B2
Nov. 10, 2020

(12) United States Patent
Chen (54) METHOD, DEVICE AND SYSTEM FOR IN-SEQUENCE LIVE STREAMING

(71) Applicant: Guangzhou Huaduo Network Technology Co., Ltd., Guangdong (CN)

(72) Inventor: Mengqi Chen, Guangdong (CN)

(73) Assignee: Guangzhou Huaduo Network Technology Co., Ltd.

(*) Notice: Subject to any disclaimer, the term of this patent is extended or adjusted under 35 U.S.C. 154(b) by 53 days.

(21) Appl. No.: 16/347,682

(22) PCT Filed: Sep. 25, 2017

(86) PCT No.: PCT/CN2017/103191
§ 371 (c)(1),
(2) Date: May 6, 2019

(87) PCT Pub. No.: WO2018/086417
PCT Pub. Date: May 17, 2018

(65) Prior Publication Data
US 2019/0320211 A1  Oct. 17, 2019

(30) Foreign Application Priority Data
Nov. 10, 2016 (CN) .......................... 2016 1 0997298

(51) Int. Cl.
*H04N 7/173* (2011.01)
*H04N 21/2187* (2011.01)
(Continued)

(52) U.S. Cl.
CPC . *H04N 21/2187* (2013.01); *H04N 21/234309* (2013.01); *H04N 21/25875* (2013.01);
(Continued)

(58) Field of Classification Search
CPC ....... H04N 21/2187; H04N 21/234309; H04N 21/25875; H04N 21/4126; H04N 21/432;
(Continued)

(56) References Cited

U.S. PATENT DOCUMENTS 7,958,532 B2 * 6/2011 Paul ..................... H04N 21/631
725/90
8,185,927 B2 * 5/2012 Karaoguz ........ H04N 21/47202
725/105
(Continued)

FOREIGN PATENT DOCUMENTS

| CN | 201491019 U | 5/2010 |
| CN | 102045540 A | 5/2011 |

(Continued)

OTHER PUBLICATIONS

International Search report of PCT/CN2017/103191, dated Dec. 19, 2017.

*Primary Examiner* — Michael B. Pierorazio
(74) *Attorney, Agent, or Firm* — Lerner, David, Littenberg, Krumholz & Mentlik, LLP (57) ABSTRACT

The invention discloses a method, device and system for in-sequence live streaming, belonging to the technical field of computers. The method includes receiving a terminal type of a streamer terminal sent by the streamer terminal during the in-sequence live streaming; determining a target transcoding mode corresponding to the terminal type of the streamer terminal according to the pre-stored corresponding relation between the terminal type and the transcoding mode; and receiving live streaming data sent by the streamer terminal, transcoding the live streaming data according to the target transcoding mode, and sending the transcoded live streaming data to a viewer terminal of a live streaming room to which the streamer terminal belongs. By the invention, (Continued)

the user can use the mobile terminal to conduct in-sequence live streaming.

5 Claims, 7 Drawing Sheets

(51) Int. Cl.
| | | |
|---|---|---|
| H04N 21/2343 | (2011.01) | |
| H04N 21/258 | (2011.01) | |
| H04N 21/41 | (2011.01) | |
| H04N 21/432 | (2011.01) | |
| H04N 21/433 | (2011.01) | |
| H04N 21/4402 | (2011.01) | |

(52) U.S. Cl.
CPC ....... *H04N 21/4126* (2013.01); *H04N 21/432* (2013.01); *H04N 21/433* (2013.01); *H04N 21/440281* (2013.01)

(58) Field of Classification Search
CPC ......... H04N 21/433; H04N 21/440281; H04N 21/4223; H04N 21/4858
USPC ......................................................... 725/115
See application file for complete search history.

(56) References Cited

U.S. PATENT DOCUMENTS

| | | | | |
|---|---|---|---|---|
| 2003/0005454 | A1* | 1/2003 | Rodriguez | H04N 21/4147 725/89 |
| 2007/0033533 | A1* | 2/2007 | Sull | G11B 27/105 715/752 |
| 2007/0157260 | A1* | 7/2007 | Walker | H04N 7/173 725/86 |
| 2008/0235587 | A1* | 9/2008 | Heie | H04N 7/142 715/719 |
| 2008/0235733 | A1* | 9/2008 | Heie | H04N 7/17318 725/46 |
| 2009/0207167 | A1* | 8/2009 | Pasetto | H04N 13/194 345/419 |
| 2010/0303442 | A1* | 12/2010 | Newton | H04N 13/359 386/241 |
| 2011/0242284 | A1* | 10/2011 | Takigawa | G09G 3/003 348/46 |

FOREIGN PATENT DOCUMENTS

| | | |
|---|---|---|
| CN | 102263941 A | 11/2011 |
| CN | 104243998 A | 12/2014 |
| CN | 104539422 A | 4/2015 |
| CN | 105791975 A | 7/2016 |
| CN | 106791892 A | 5/2017 |

\* cited by examiner

```
┌─────────────────────────────────────────────────┐
│ During an in-sequence live streaming, when it is │
│    detected that an account identifier of an     │
│ account logged in locally is located in a preset │─── 101
│    position of a list of speaking sequence, a    │
│   streamer terminal sends the local target       │
│        terminal type to the server               │
└─────────────────────────────────────────────────┘
                        │
                        ▼                          ─── 102
┌─────────────────────────────────────────────────┐
│ During the in-sequence live streaming the server │
│  receives a terminal type of a streamer terminal │
│          sent by the streamer terminal           │
└─────────────────────────────────────────────────┘
                        │
                        ▼                          ─── 103
┌─────────────────────────────────────────────────┐
│    The server determines the target transcoding  │
│   mode corresponding to the terminal type of the │
│    streamer terminal according to the pre-stored │
│ corresponding relation between the terminal type │
│             and the transcoding mode             │
└─────────────────────────────────────────────────┘
                        │
                        ▼                          ─── 104
┌─────────────────────────────────────────────────┐
│      When a start stream triggering event is     │
│    detected, the streamer terminal acquires the  │
│  live streaming data and sends the live streaming│
│                 data to the server               │
└─────────────────────────────────────────────────┘
                        │
                        ▼                          ─── 105
┌─────────────────────────────────────────────────┐
│ The server receives the live streaming data sent │
│   by the streamer terminal, transcodes the live  │
│       streaming data according to the target     │
│  transcoding mode, and sends the transcoded live │
│    streaming data to the viewer terminal of the  │
│      live streaming room to which the streamer   │
│                  terminal belongs                │
└─────────────────────────────────────────────────┘
```

FIG. 10

METHOD, DEVICE AND SYSTEM FOR IN-SEQUENCE LIVE STREAMING

CROSS-REFERENCE TO RELATED APPLICATIONS

The present application is a national phase entry under 35 U.S.C. § 371 of International Application No. PCT/CN2017/103191 filed Sep. 25, 2017, which claims priority from Chinese Application No. 201610997298.7 filed Nov. 10, 2016, all of which are hereby incorporated herein by reference.

FIELD OF THE INVENTION

The present invention relates to the field of computer technology, and in particular, to a method, device and system for in-sequence live streaming.

BACKGROUND OF THE INVENTION

With the development of computer and internet technologies, webcasting has been continuously developed and widely popularized, and has become a hot topic in people's work and life in today's society.

At present, there is a form of live streaming called in-sequence live streaming. That is, multiple streamers can take turn to perform live streaming in a same live streaming room for a certain period of time according to their speaking sequence in a list. For example, if a list of a live streaming room shows a sequence in which three streamers A, B, and C will stream in the same live streaming room, and each streamer has 5 minutes to perform, the streamer A performs for a first 5 minutes, then streamer B performs for a next 5 minutes, and finally the streamer C performs for a third 5 minutes.

In the process of implementing the present invention, the inventors have found that the prior art has at least the following problems.

The current in-sequence live streaming is limited to streaming through a computer by a streamer, so that when there is no computer around the streamer, it is impossible to perform an in-sequence live streaming.

SUMMARY OF THE INVENTION

In order to solve the problem of the prior art, embodiments of the present invention provide a method, device, and system for in-sequence live streaming. The technical solution is as follows.

In a first embodiment, a method for in-sequence live streaming is provided, and the method comprises:

receiving a terminal type of a streamer terminal sent by the streamer terminal during the in-sequence live streaming;

determining a target transcoding mode corresponding to the terminal type of the streamer terminal according to the pre-stored corresponding relation between the terminal type and the transcoding mode; and receiving live streaming data sent by the streamer terminal, transcoding the live streaming data according to the target transcoding mode, and sending the transcoded live streaming data to a viewer terminal of a live streaming room to which the streamer terminal belongs.

Optionally, sending the transcoded live streaming data to a viewer terminal includes:

obtaining terminal type of each viewer terminal of the live streaming room to which the streamer terminal belongs; and performing image cropping on the transcoded live streaming data based on display ratio of the terminal type of the viewer terminal and display ratio of the terminal type of the streamer terminal, and sending the cropped live streaming data to the viewer terminal.

By this way, a server may first perform image cropping on the live streaming data, and then send the live streaming data suitable for the display ratio of the viewer terminal to the viewer terminal.

Optionally, before receiving the live streaming data sent by the streamer terminal, the method further includes:

obtaining an account identifier of an account currently logged in the streamer terminal; and sending a start streaming prompt to the streamer terminal if it is detected that a target authentication information corresponding to the account identifier and the target terminal type is stored locally.

In this way, the server can determine, by using the authentication information, whether the account that logs in to the streamer terminal has the right to stream.

In a second aspect, a method for in-sequence live streaming is provided, and the method comprises:

during the in-sequence live streaming, upon detection of the account identifier of the account logged in locally is located in a preset position of a list of speaking sequence, sending the local terminal type to the server, so that the server is able to determine a target transcoding mode corresponding to the terminal type based on a pre-stored corresponding relation between the terminal type and transcoding mode; and obtaining live streaming data and sending the live streaming data to the server when a start streaming triggering event is detected, so that the server transcodes the live streaming data according to the target transcoding mode, and sends the transcoded live streaming data to the viewer terminal.

Optionally, the step of obtaining live streaming data and sending the live streaming data to the server when a start streaming triggering event is detected includes:

receiving and displaying a start streaming prompt sent by the server, and when a start streaming instruction input by the user is received, obtaining live streaming data, and sending the live streaming data to the server.

In this way, the user can start streaming according to the start streaming prompt sent by the server and displayed on the streamer terminal.

In a third aspect, a server is provided, the server comprising:

a receiving module for receiving a terminal type of a streamer terminal sent by the streamer terminal during the in-sequence live streaming;

a determination module for determining a target transcoding mode corresponding to the terminal type of the streamer terminal according to the pre-stored corresponding relation between the terminal type and the transcoding mode; and a sending module for receiving live streaming data sent by the streamer terminal, transcoding the live streaming data according to the target transcoding mode, and sending the transcoded live streaming data to a viewer terminal of a live streaming room to which the streamer terminal belongs.

Optionally, the sending module is configured for:

obtaining terminal type of each viewer terminal of the live streaming room to which the streamer terminal belongs; and performing image cropping on the transcoded live streaming data based on display ratio of the terminal type of the viewer terminal and display ratio of the terminal type of the streamer terminal, and sending the cropped live streaming data to the viewer terminal.

Optionally, the server further includes:

an obtaining module for obtaining an account identifier of an account currently logged in the streamer terminal; and a detection module for sending a start streaming prompt to the streamer terminal if it is detected that a target authentication information corresponding to the account identifier and the target terminal type is stored locally.

In a fourth aspect, a streamer terminal is provided, and the streamer terminal includes:

a first sending module for sending the local terminal type to the server, so that the server is able to determine a target transcoding mode corresponding to the terminal type based on a pre-stored corresponding relation between the terminal type and transcoding mode during the in-sequence live streaming, when it is detected that the account identifier of the account logged in locally is located in a preset position of a list of speaking sequence; and a second sending module for obtaining live streaming data and sending the live streaming data to the server when a start streaming triggering event is detected, so that the server transcodes the live streaming data according to the target transcoding mode, and sends the transcoded live streaming data to the viewer terminal.

Optionally, the second sending module is configured for:

receiving and displaying a start streaming prompt sent by the server, and when a start streaming instruction input by the user is received, obtaining live streaming data, and sending the live streaming data to the server.

In a fifth aspect, a system for in-sequence live streaming is provided, the system comprising a server and a streamer terminal.

The server is intended for:

determining a target transcoding mode corresponding to the terminal type of the streamer terminal according to the pre-stored corresponding relation between the terminal type and the transcoding mode; and receiving live streaming data sent by the streamer terminal, transcoding the live streaming data according to the target transcoding mode, and sending the transcoded live streaming data to a viewer terminal of a live streaming room to which the streamer terminal belongs.

The streamer terminal is used for:

during the in-sequence live streaming, when it is detected that the account identifier of the account logged in locally is located in a preset position of a list of speaking sequence, sending the local terminal type to the server; and obtaining live streaming data and sending the live streaming data to the server when a start streaming triggering event is detected.

The beneficial effects brought by the technical solution of the embodiments of the present invention include:

In the embodiments of the present invention, during the in-sequence live streaming, the terminal type of the streamer terminal sent by the streamer terminal is received, and the target transcoding corresponding to the terminal type of the streamer terminal is determined according to the pre-stored corresponding relation between the terminal type and the transcoding mode. The live streaming data sent by the streamer terminal is received, the live streaming data is transcoded according to the target transcoding mode, and the transcoded live streaming data is sent to the viewer terminal of the live streaming room to which the streamer terminal belongs. In this way, even if there is no computer around the streamer, he can use the mobile terminal such as mobile phone or tablet to conduct live streaming.

BRIEF DESCRIPTION OF THE DRAWINGS

In order to more clearly illustrate the technical solution in the embodiments of the present invention, the drawings used in the description of the embodiments will be briefly described below. It is obvious that the drawings in the following description are only some embodiments of the present invention. For those skilled in the art, other drawings can be obtained according to these drawings without any creative work.

DETAILED DESCRIPTION OF THE INVENTION

In order to achieve the above objectives, technical solution and advantages of the present invention clearer, the embodiments of the present invention will be further described in detail below with reference to the accompanying drawings.

The embodiments of the invention provide a method for in-sequence live streaming, which can be implemented by a terminal and a server. The terminal may be a terminal used by the streamer to perform live streaming; it may be installed with a live streaming application, and it may be a mobile phone or a tablet, or a PC, and the server may be a server for live streaming applications. The terminal may be configured to have a processor, a memory, and a transceiver. The processor may be used for related processing of the in-sequence live streaming, and the memory may be used for storing data required and generated in the following processing, and the transceiver may be used for receiving and sending data. The terminal may further be provided with an audio acquiring unit and a video acquiring unit, which may be respectively used for collecting audio data and video data during the in-sequence live streaming of the user, and the terminal may further be provided with an input unit and an output unit for receiving an instruction input by the user, and displaying content that needs to be displayed during the in-sequence live streaming. When the terminal is a mobile terminal, the input and output unit may be a touch screen. When the terminal is a PC, the input unit may be a mouse and a keyboard, and the output unit may be a screen. The server may be provided with a processor, a memory, and a transceiver. The processor may be used for processing the in-sequence live streaming. The memory may be used to store data required and generated in the following processing, and the transceiver may be used to receive and send data.

Figure 1:
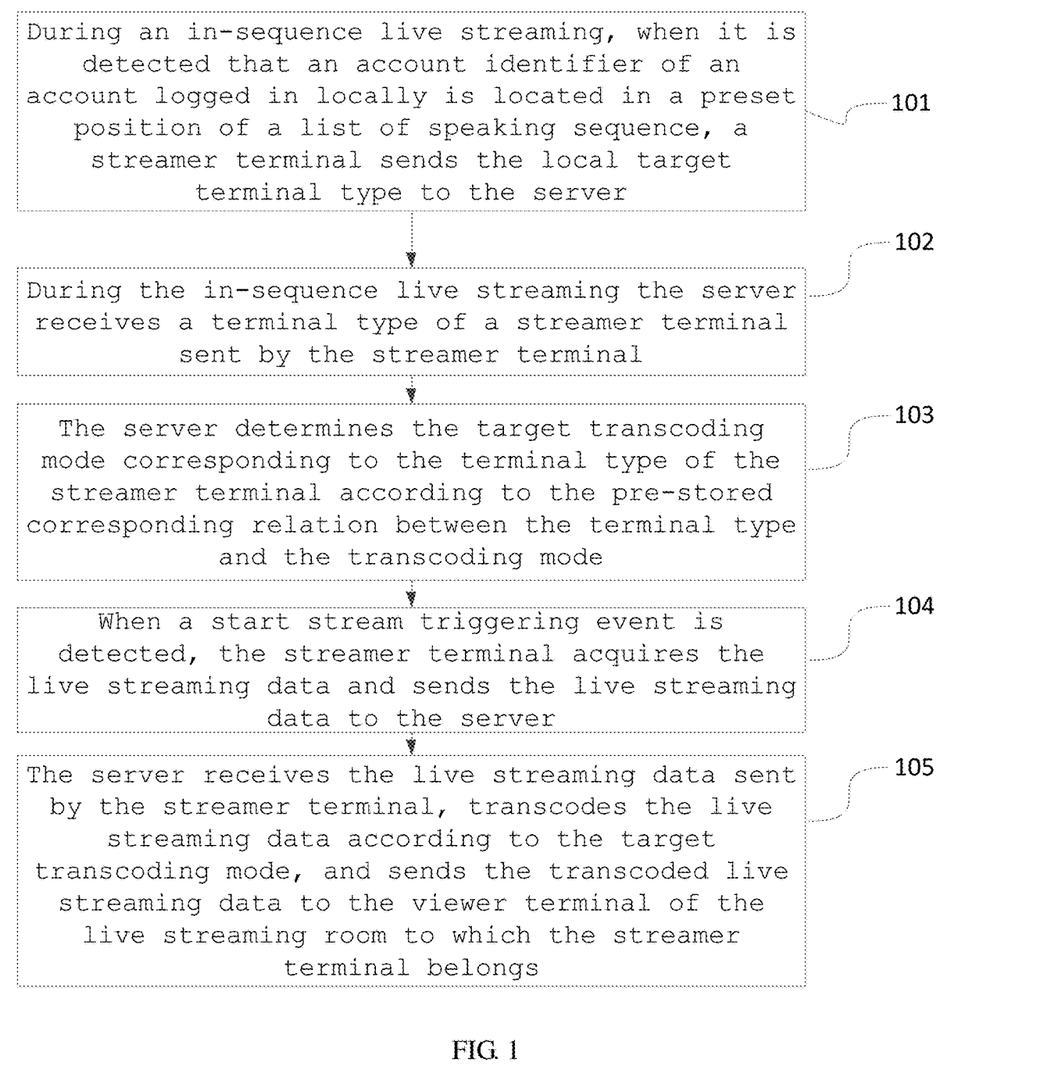
FIG. 1 is a flowchart of a method for in-sequence live streaming according to an embodiment of the present invention.

The processing flow shown in FIG. 1 will be described in detail below with reference to specific embodiments.

Step 101

During an in-sequence live streaming, when it is detected that an account identifier of an account logged in locally is located in a preset position of a list of speaking sequence, a streamer terminal sends the local target terminal type to the server.

Figure 2:
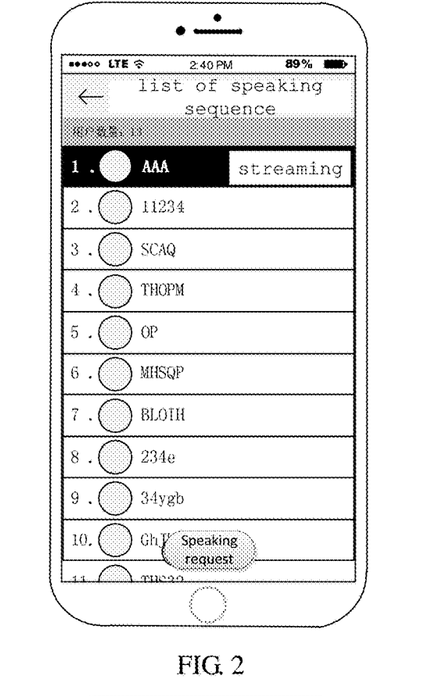
FIG. 2 is a schematic diagram of display of a list of speaking sequence according to an embodiment of the present invention.

In the implementation, the user can install a live streaming application for performing live streaming on the terminal, and the server of the live streaming application provides the form of in-sequence live streaming. When the user wants to participate in the in-sequence live streaming, he can run the above-mentioned live streaming application, then click on the search button and enter a live streaming room in which he want to participate in in-sequence live streaming. At this time, the live streaming screen in progress can be displayed on the terminal, and a button for viewing a list of speaking sequence can also be displayed. When the user clicks the button, the terminal can display a list of speaking sequence of a current live streaming room, an account identifier of at least one account can be recorded on the list, and an account identifier of a streamer currently streaming ranks first on the list. The bottom end of the list of speaking sequence can be displayed with a speaking request button, the list of speaking sequence can be as shown in FIG. 2, and the user can use the terminal to log into the account. If the account has the streaming request permission, the user can click the speaking request button, and the account identifier of the account can be displayed at the last position of the list of speaking sequence. If the account does not have the streaming request permission, the button is disabled and cannot be triggered. It should be noted that the live streaming room of each in-sequence live streaming can be provided with an administrator, and the administrator can set the rules of the in-sequence live streaming, for example setting the following things: 1. the length of speaking, that is, the duration of each user's live streaming; 2. streaming request permission, that is, which account is permitted to make a request for streaming and to enter the list of speaking sequence; 3. rearranged position in the speaking sequence, that is, after the live streaming of an user with the first position ends, the corresponding account identifier exits the list of speaking sequence or is added to the last position of the list; and 4. the administrator can also manually add an account identifier of an account to any position on the list of speaking sequence.

After being added to the list of speaking sequence, the position of the account identifier of the user account on the list of speaking sequence gradually rise as the in-sequence live streaming progresses, and when the terminal detects that the account identifier rises to a preset position on the list of speaking sequence, it will obtain and send the local target terminal type to the server. In this embodiment, when the position of the logged-in account identifier changes on the list of speaking sequence, and the terminal sends a position query message to the server, and the foregoing detection may be triggered according to the message returned by the server, or may be triggered by the self-calculated waiting time based on the obtained length of speaking and the position when being added to the list of speaking sequence. It deserves to be mentioned that the preset position on the list of speaking sequence may be determined by the server according to the length of speaking of a current live streaming room, and the position may be for example the first place, or the second, third place, etc., of the list of speaking sequence. In addition, the terminal type information can be divided into a mobile terminal and a PC terminal according to different streamer terminal devices, and the mobile terminal can be further divided into an iOS mobile phone and an Android mobile phone based on operating systems.

Step 102

During the in-sequence live streaming the server receives a terminal type of a streamer terminal sent by the streamer terminal.

In the embodiment, in the in-sequence live streaming, after the streamer terminal sends the local target terminal type to the server, the server may receive the target terminal type sent by the corresponding streamer terminal, and then the target terminal type and the account identifier of the account of the login streamer terminal may be stored correspondingly.

Step 103

The server determines the target transcoding mode corresponding to the terminal type of the streamer terminal according to the pre-stored corresponding relation between the terminal type and the transcoding mode.

In the implementation, the technician on the server side can develop a live streaming application for streamers terminals of different terminal type using different codes. Therefore, after receiving the live streaming data sent by the streamer terminal, the live streaming data needs to be transcoded based on different transcoding modes. Therefore, the technician can set the corresponding transcoding mode for different terminal types and store them in the server in a form of corresponding relation. There are multiple terminal types in the corresponding relation, and each terminal type may have the same or different transcoding mode. In this way, after the server receives the target terminal type sent by the streamer terminal, the target transcoding mode corresponding to the target terminal type may be determined based on the corresponding relation.

Optionally, before the live streaming, the server needs to detect whether the streamer account has the right to perform live streaming, and the corresponding process is as follows: obtaining an account identifier of an account currently logged in the streamer terminal, and if it is detected that a target authentication information corresponding to the account identifier and the target terminal type is locally stored, sends a start streaming prompt to the streamer terminal.

In the implementation, if the user wants to live stream through a live streaming application installed on the terminal (including in-sequence live streaming), it is necessary to register the account in advance, and then register the authentication information corresponding to the account. In this embodiment, for the streamer terminals of different terminal types, the user needs to register different authentication information. If the user wants to perform live streaming on the computer, the user needs to register the real-name authentication information, affiliated association information, agreement information between the user and the live room, and the like. If the user wants to use the mobile phone for live streaming, the user needs to register authentication information such as real-name authentication information and communication account binding information, and the server can store the authentication information, the account identifier, and the terminal type locally, so that before the streaming, the server may obtain an account identifier of an account currently logged in the streamer terminal, and a terminal type of the streamer terminal, and then detect whether the corresponding target authentication information is stored locally. That is, it is detected whether the user has registered the authentication information. If all the authentication information exists, the authentication succeeds, and the server may send a start streaming prompt to the streamer terminal. If it does not exist (or an authentication information is missing), the authentication fails. An authentication failure prompt may be sent to the streamer terminal.

Step 104

When a start stream triggering event is detected, the streamer terminal acquires the live streaming data and sends the live streaming data to the server.

In the implementation, when in-sequence live streaming is in process, the user may pre-set the start stream triggering event on the streamer terminal, and the start stream triggering event may be that the streamer terminal detects that the account identifier of the currently logged account reaches the first position of the list of speaking sequence, or the countdown of streaming set by the terminal is completed. When the terminal detects that the stream triggering event occurs, the streaming process can be started. Specifically, the terminal can obtain live streaming data using a live streaming data collection device (such as a camera for acquiring video data and a microphone for acquiring audio data by the user), and the live streaming data collection device corresponding to the streamer terminal of different terminal types is different, and the obtained live streaming data format is also different. Then, the terminal may perform video processing on the obtained live streaming data, such as picture edition, watermarking, etc., and compress and encode the processed live streaming data, and then send the live streaming data to the server. During the live streaming, the live streaming page can display a live streaming time countdown. The user can choose to stop the broadcast automatically or wait for the live streaming time to arrive automatically. After the live streaming ends, the account identifier of the streamer account can exit the list of speaking sequence or become the last one of the list of speaking sequence.

Optionally, the server performs authentication to the streamer account, and sends a start streaming prompt. The step 105 is as follows: receiving and displaying the start streaming prompt sent by the server, and acquiring the live streaming data when receiving the start streaming prompt input by the user, and then sending live streaming data to the server.

Figure 3:
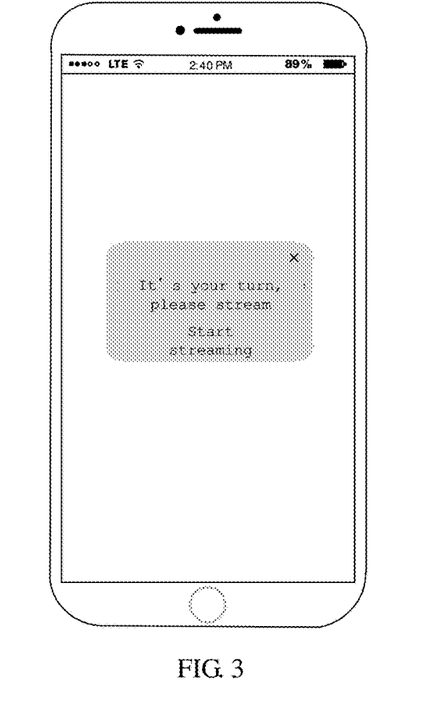
FIG. 3 is a schematic diagram of a start streaming prompt according to an embodiment of the present invention.
Figure 4:
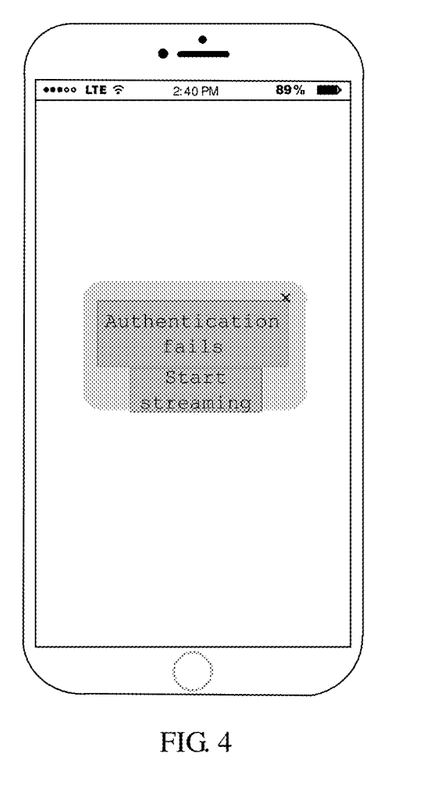
FIG. 4 is a schematic diagram of an authentication failure prompt according to an embodiment of the present invention.

In the implementation, after the server successfully authenticates the streamer terminal, it may send a start streaming prompt to the streamer terminal. After receiving the start streaming prompt, the streamer terminal may prompt or guide the user to start the live streaming. Specifically, the terminal may display a start streaming prompt window, as shown in FIG. 3. A streaming button may be set in the start streaming prompt window. When the user clicks the streaming button, the terminal can receive the streaming instruction input by the user, so the live streaming data can be obtained through the live streaming data collection device. It should be noted that the server may send a start streaming prompt to the terminal in advance to ensure that the user has enough time to prepare for the broadcast. For example, the start streaming prompt may be sent when the account identifier of the account of the login terminal reaches the second and third positions of the list of speaking sequence. It can be understood that if the authentication fails, the terminal can receive and display the authentication failure prompt sent by the server, as shown in FIG. 4.

Step 105

The server receives the live streaming data sent by the streamer terminal, transcodes the live streaming data according to the target transcoding mode, and sends the transcoded live streaming data to the viewer terminal of the live streaming room to which the streamer terminal belongs.

In implementation, after receiving the live streaming data sent by the streamer terminal, the server may transcode the live streaming data according to the target transcoding mode corresponding to the target terminal type determined in step 103. At the same time, the server can obtain a channel number of the live streaming room to which the streamer terminal belongs, and then determine the viewer terminal of the live streaming room according to the channel number. Therefore, the live streaming data sent by the streamer terminal can be sent to the corresponding viewer terminal. It is worth mentioning that the server transcodes the live streaming data to obtain live streaming data in different formats. Here, the format may include: resolution, bitrate, etc., and then the server may send live streaming data having corresponding format to each viewer terminal according to a live streaming data request sent by the same viewer terminal. It can be understood that the order of step 103 and step 104 may not be limited, that is, the process of sending the live streaming data from the streamer terminal and the process of determining the transcoding mode by the server can be carried out in no particular order.

Optionally, before the server sends the live streaming data to the viewer terminal, the image of the live streaming data may be cropped based on the terminal type of the streamer terminal and the viewer terminal. The processing is as follows: obtaining the terminal type of the viewer terminal for each viewer terminal in the live streaming room to which the streamer terminal belongs; and performing image cropping to the transcoded live streaming data based on the image ratio of the terminal type of the viewer terminal and that of the terminal type of the streamer terminal, and sending the cropped live streaming data to the viewer terminal.

Figure 5:
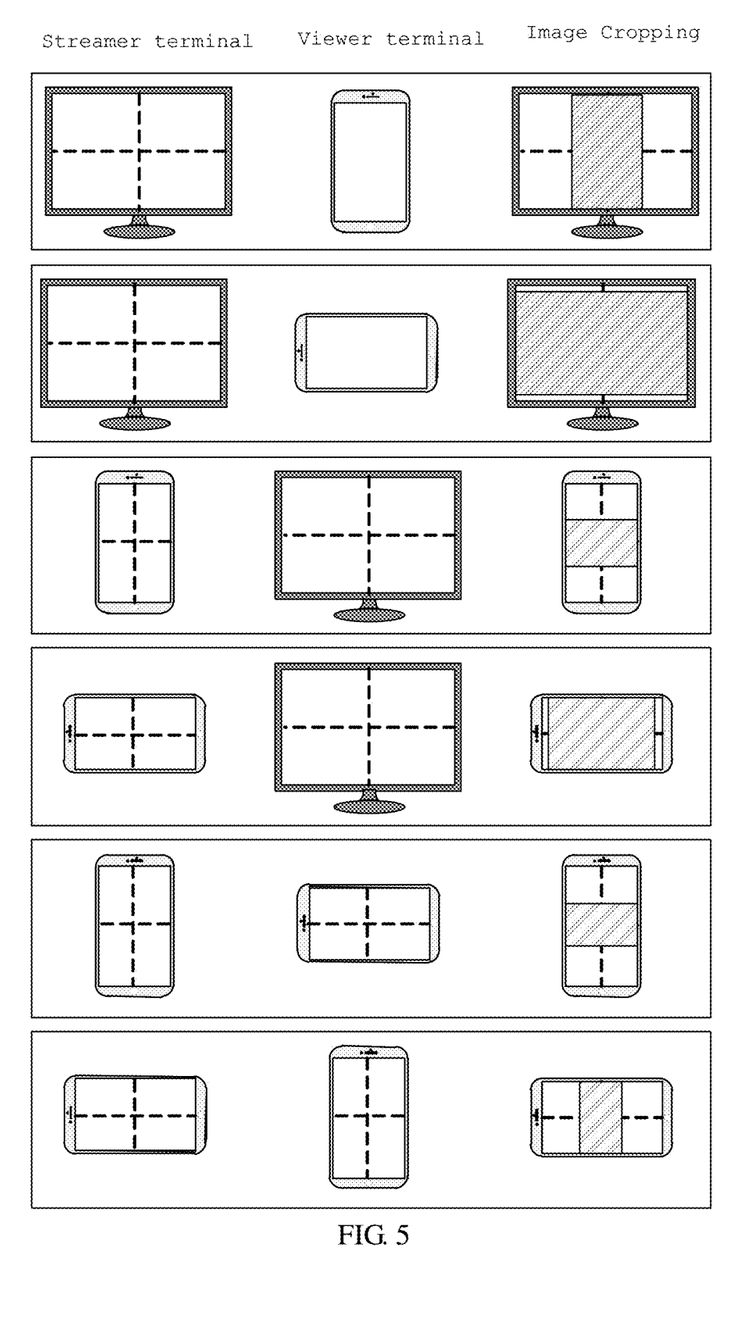
FIG. 5 is a schematic diagram of screen cutting of live streaming data according to an embodiment of the present invention.

In the implementation, after receiving the live streaming data sent by the streamer terminal, the server may perform transcoding on the live streaming data. At the same time, the server may receive a live streaming data acquisition request sent by the viewer terminal; the live streaming data acquisition request may carry the channel number of the live streaming room and the terminal type of the viewer terminal. Then, the server may determine, according to the channel number of the live room, the viewer terminal of the live streaming room to which the streamer terminal belongs, and for each of the above-mentioned viewer terminals, after determining the terminal type of the terminal, the server may perform image cropping to the transcoded live streaming data based the image ratio of the terminal type of the viewer terminal and that of the terminal of the streamer terminal. Specifically, if the streamer terminal is a computer and the viewer terminal is a mobile phone, in the image center of the live streaming data the center, cut out an area image that fits the image ratio of the mobile phone to the maximum extent, and further, the server may crop the image with different image ratios based on a landscape viewing mode and a vertical viewing mode of the mobile phone respectively. Similarly, when the streamer terminal is a mobile phone and the viewer terminal is a computer, the image cropping can also be performed based on the above method, and cropping with different image ratios can be performed based on a landscape streaming mode and a vertical streaming mode of the mobile phone respectively. It can be understood that when the streamer terminal and the viewer terminal are both computers, no image cropping is required, and when they are both mobile phones, the corresponding image cropping process needs to be performed according to the landscape and vertical screen modes during live streaming and viewing, as shown in FIG. 5. The server can then send the cropped live streaming data to the viewer terminal.

In the embodiments of the present invention, during the in-sequence live streaming, the terminal type of the streamer terminal sent by the streamer terminal is received, and the target transcoding corresponding to the terminal type of the streamer terminal is determined according to the pre-stored corresponding relation between the terminal type and the transcoding mode. The live streaming data sent by the streamer terminal is received, the live streaming data is transcoded according to the target transcoding mode, and the transcoded live streaming data is sent to the viewer terminal of the live streaming room to which the streamer terminal belongs. In this way, even if there is no computer around the streamer, he can use the mobile terminal such as mobile phone or tablet to conduct live streaming.

Figure 6:
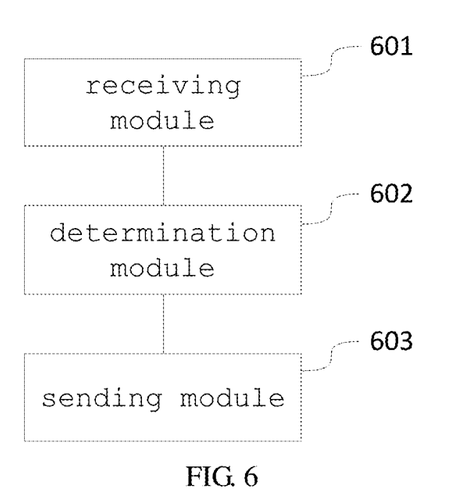
FIG. 6 is a schematic structural diagram of a server according to an embodiment of the present invention.

Based on the same technical concept, an embodiment of the present invention further provides a server. As shown in FIG. 6, the server includes:

a receiving module 601 for receiving a terminal type of a streamer terminal sent by the streamer terminal during the in-sequence live streaming;

a determination module 602 for determining a target transcoding mode corresponding to the terminal type of the streamer terminal according to the pre-stored corresponding relation between the terminal type and the transcoding mode; and a sending module 603 for receiving live streaming data sent by the streamer terminal, transcoding the live streaming data according to the target transcoding mode, and sending the transcoded live streaming data to a viewer terminal of a live streaming room to which the streamer terminal belongs.

Optionally, the sending module 603 is configured for:

obtaining terminal type of each viewer terminal of the live streaming room to which the streamer terminal belongs; and performing image cropping on the transcoded live streaming data based on display ratio of the terminal type of the viewer terminal and display ratio of the terminal type of the streamer terminal, and sending the cropped live streaming data to the viewer terminal.

Figure 7:
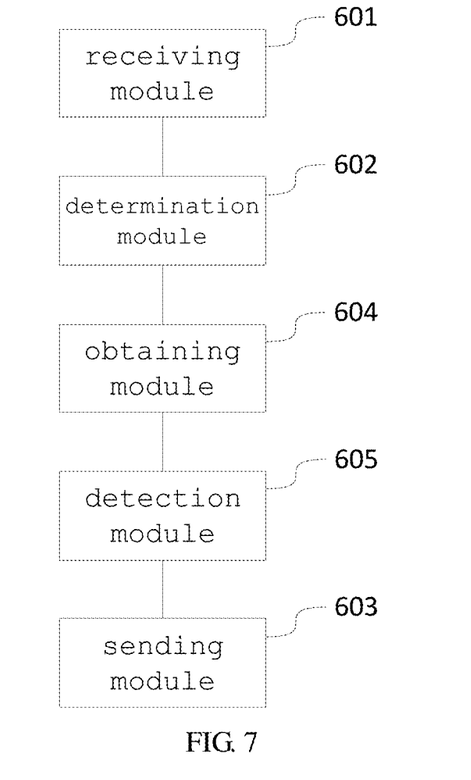
FIG. 7 is a schematic structural diagram of a server according to an embodiment of the present invention.

Optionally, as shown in FIG. 7, the server further includes:

an obtaining module 604 for obtaining an account identifier of an account currently logged in the streamer terminal; and a detection module 605 for sending a start streaming prompt to the streamer terminal if it is detected that a target authentication information corresponding to the account identifier and the target terminal type is stored locally.

Figure 8:
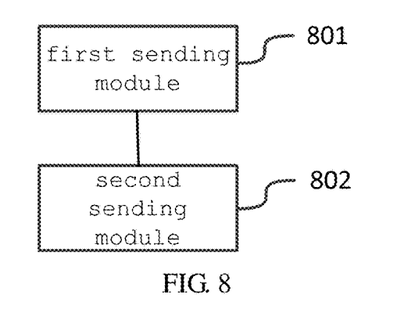
FIG. 8 is a schematic structural diagram of a streamer terminal according to an embodiment of the present invention.

Based on the same technical concept, an embodiment of the present invention further provides a streamer terminal. As shown in FIG. 8, the streamer terminal includes:

a first sending module 801 for sending the local terminal type to the server, so that the server is able to determine a target transcoding mode corresponding to the terminal type based on the pre-stored corresponding relation between the terminal type and transcoding mode during the in-sequence live streaming, when it is detected that the account identifier of the account logged in locally is located in a preset position of a list of speaking sequence; and a second sending module 802 for obtaining live streaming data and sending the live streaming data to the server when a start streaming triggering event is detected, so that the server transcodes the live streaming data according to the target transcoding mode, and sends the transcoded live streaming data to the viewer terminal.

Optionally, the second sending module 802 is configured for receiving and displaying a start streaming prompt sent by the server, and when a start streaming instruction input by the user is received, obtaining live streaming data, and sending the live streaming data to the server.

In the embodiments of the present invention, during the in-sequence live streaming, the terminal type of the streamer terminal sent by the streamer terminal is received, and the target transcoding corresponding to the terminal type of the streamer terminal is determined according to the pre-stored corresponding relation between the terminal type and the transcoding mode. The live streaming data sent by the streamer terminal is received, the live streaming data is transcoded according to the target transcoding mode, and the transcoded live streaming data is sent to the viewer terminal of the live streaming room to which the streamer terminal belongs. In this way, even if there is no computer around the streamer, he can use the mobile terminal such as mobile phone or tablet to conduct live streaming.

It should be noted that, when the device for in-sequence live streaming provided in the above-mentioned embodiment is performing an in-sequence live streaming, the above functional modules are illustrated only based on their functions. In actual applications, the functions may be allocated by different functional modules as needed. Upon completion, the internal structure of the device is divided into different functional modules to perform all or part of the functions described above. In addition, the embodiments of the present invention provides the same concept as the method for implementing the in-sequence live streaming, and the specific implementation process is described in the method embodiment, and details are not described herein.

Based on the same technical concept, yet another exemplary embodiment of the present invention provides a system for in-sequence live streaming, the system including a server and a streamer terminal.

The server is intended for:

determining a target transcoding mode corresponding to the terminal type of the streamer terminal according to the pre-stored corresponding relation between the terminal type and the transcoding mode; and receiving live streaming data sent by the streamer terminal, transcoding the live streaming data according to the target transcoding mode, and sending the transcoded live streaming data to a viewer terminal of a live streaming room to which the streamer terminal belongs.

The streamer terminal is used for:

during the in-sequence live streaming, when it is detected that the account identifier of the account logged in locally is located in a preset position of a list of speaking sequence, sending the local terminal type to the server; and obtaining live streaming data and sending the live streaming data to the server when a start streaming triggering event is detected.

In the embodiments of the present invention, during the in-sequence live streaming, the terminal type of the streamer terminal sent by the streamer terminal is received, and the target transcoding corresponding to the terminal type of the streamer terminal is determined according to the pre-stored corresponding relation between the terminal type and the transcoding mode. The live streaming data sent by the streamer terminal is received, the live streaming data is transcoded according to the target transcoding mode, and the transcoded live streaming data is sent to the viewer terminal of the live streaming room to which the streamer terminal belongs. In this way, even if there is no computer around the streamer, he can use the mobile terminal such as mobile phone or tablet to conduct live streaming.

Figure 9:
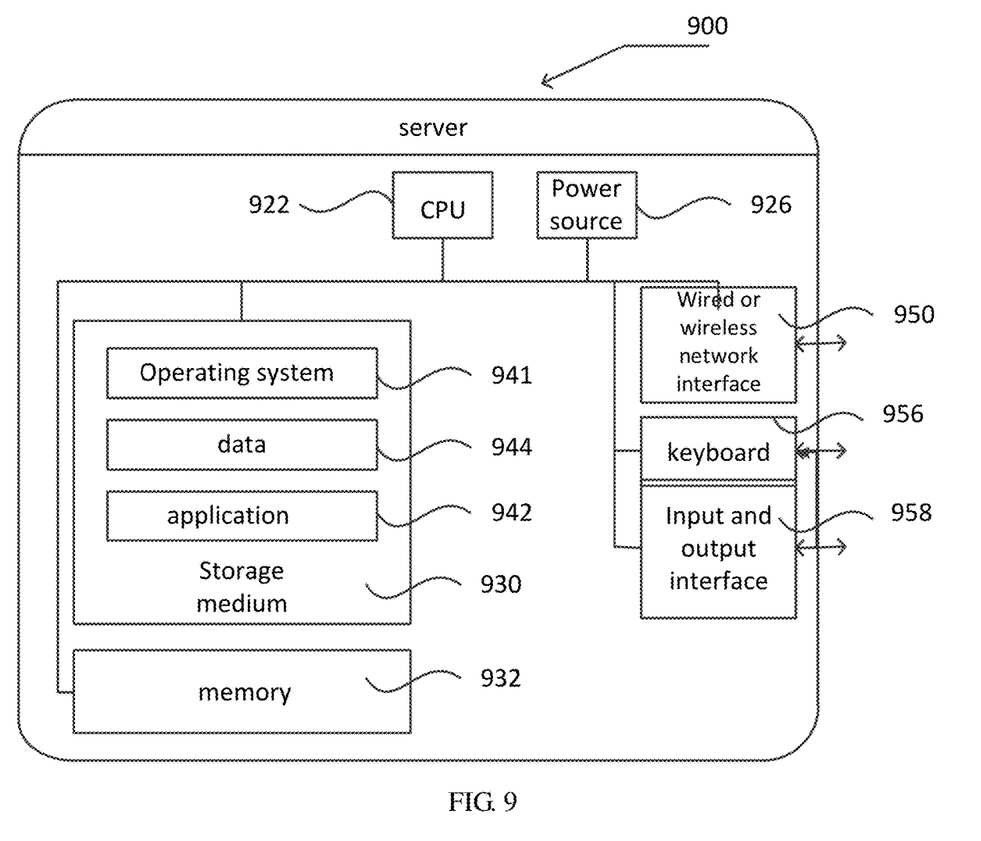
FIG. 9 is a schematic structural diagram of a server according to an embodiment of the present invention.

The embodiments of the present invention further provide a server, and FIG. 9 is a schematic structural diagram of a server according to an embodiment of the present invention. The server 900 can make a large difference due to different configurations or performances. It may include one or more central processing units (CPU) 922 (e.g., one or more processors) and memory 932, one or more storage mediums 930 that store application 942 or data 944 (e.g., one or more mass storage device). The program stored on storage medium 930 may include one or more modules (not shown), each of which may include a series of instructions in the server. Still further, the central processing unit 922 can be configured to communicate with the storage medium 930, executing a series of instructions stored in the storage medium 930 on the server 900.

The server 900 may also include one or more power sources 926, one or more wired or wireless network interfaces 950, one or more input and output interfaces 958, one or more keyboards 956, and/or one or more operating systems 941, such as Windows Server™, Mac OS X™, Unix™, Linux™, FreeBSD™ and the like.

The server 900 can include a memory, and one or more programs, wherein said one or more programs are stored in said memory, and are configured to be executed by one or more processors. The one or more programs include instructions for running the following operations:

a receiving module for receiving a terminal type of a streamer terminal sent by the streamer terminal during the in-sequence live streaming;

a determination module for determining a target transcoding mode corresponding to the terminal type of the streamer terminal according to the pre-stored corresponding relation between the terminal type and the transcoding mode; and a sending module for receiving live streaming data sent by the streamer terminal, transcoding the live streaming data according to the target transcoding mode, and sending the transcoded live streaming data to a viewer terminal of a live streaming room to which the streamer terminal belongs.

Optionally, the sending module is configured for:

obtaining terminal type of each viewer terminal of the live streaming room to which the streamer terminal belongs; and performing image cropping on the transcoded live streaming data based on display ratio of the terminal type of the viewer terminal and display ratio of the terminal type of the streamer terminal, and sending the cropped live streaming data to the viewer terminal.

Optionally, the server further includes:

an obtaining module for obtaining an account identifier of an account currently logged in the streamer terminal; and a detection module for sending a start streaming prompt to the streamer terminal if it is detected that a target authentication information corresponding to the account identifier and the target terminal type is stored locally.

In the embodiments of the present invention, during the in-sequence live streaming, the terminal type of the streamer terminal sent by the streamer terminal is received, and the target transcoding corresponding to the terminal type of the streamer terminal is determined according to the pre-stored corresponding relation between the terminal type and the transcoding mode. The live streaming data sent by the streamer terminal is received, the live streaming data is transcoded according to the target transcoding mode, and the transcoded live streaming data is sent to the viewer terminal of the live streaming room to which the streamer terminal belongs. In this way, even if there is no computer around the streamer, he can use the mobile terminal such as mobile phone or tablet to conduct live streaming.

Figure 10:
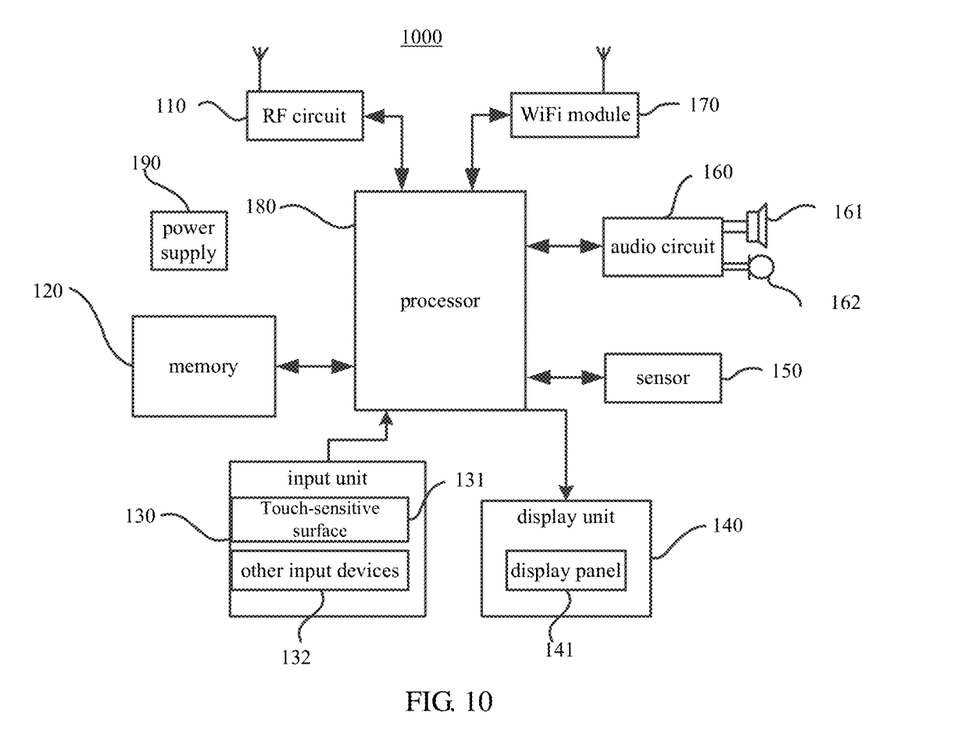
FIG. 10 is a schematic structural diagram of a streamer terminal according to an embodiment of the present invention.

An embodiment of the present invention further provides a terminal. FIG. 10 shows a schematic structural diagram of a streamer terminal for in-sequence live streaming. The streamer terminal may be used to implement the foregoing method for in-sequence live streaming.

A streamer terminal 1000 may include an RF (Radio Frequency) circuit 110, a memory 120 including one or more computer readable storage mediums, an input unit 130, a display unit 140, a sensor 150, an audio circuit 160, and a WiFi module 170 (wireless fidelity), a processor 180 having one or more processing cores, and a power supply 190 and the like. It will be understood by those skilled in the art that the streamer terminal structure shown in FIG. 10 does not constitute a limitation of the streamer terminal, and may include more or less components than those illustrated, or combine some components, or different component arrangements.

Here, the RF circuit 110 can be used for sending and receiving information, or receiving and sending signals during a call. Specifically, after the downlink information of the base station is received, the downlink information is processed by one or more processors 180. In addition, the data related to the uplink is sent to the base station. Generally, the RF circuit 110 includes, but is not limited to, an antenna, at least one amplifier, a tuner, one or more oscillators, a Subscriber Identity Module (SIM) card, a transceiver, a coupler, an LNA (Low Noise Amplifier), a duplexer, etc. In addition, the RF circuitry 110 can also communicate with the network and other devices via wireless communication. The wireless communication may use any communication standard or protocol, including but not limited to GSM (Global System of Mobile communication), GPRS (General Packet Radio Service), CDMA (Code Division Multiple Access, Code Division Multiple Access), WCDMA (Wideband Code Division Multiple Access), LTE (Long Term Evolution), e-mail, SMS (Short Messaging Service), etc.

The memory 120 can be used to store software program and modules, and the processor 180 executes various functional applications and data processing by running software programs and modules stored in the memory 120. The memory 120 may mainly include a storage program area and a storage data area, wherein the storage program area may store an operating system, an application required for at least one function (such as a sound playing function, an image playing function, etc.), and the like; the storage data area may be stored according to The data created by the use of the terminal 1100 (such as audio data, phone book, etc.) and the like. Moreover, memory 120 can include high speed random access memory, and can also include non-volatile memory, such as at least one magnetic disk storage device, flash memory device, or other volatile solid state storage device. Accordingly, memory 120 may also include a memory controller to provide access to the memory 120 by the processor 180 and the input unit 130.

The input unit 130 can be configured to receive the input numeric or character information and to generate keyboard, mouse, joystick, optical or trackball signal inputs related to user settings and function controls. In particular, the input unit 130 can include a touch-sensitive surface 131 as well as other input devices 132. The touch-sensitive surface 131, also referred to as a touch display or track-pad, can collect touch operations on or near it (for example the user may use a finger, stylus, any suitable object or accessory on the touch-sensitive surface 131 to form some operations) and drive corresponding connecting device according to a preset program. Alternatively, the touch-sensitive surface 131 can include a touch detection device and a touch controller. The touch detection device detects the touch orientation of the user, and detects a signal brought by the touch operation, and sends the signal to the touch controller; the touch controller receives the touch information from the touch detection device, converts the touch information into contact coordinates, and sends the touch information to the processor 180, and it can also receive commands from the processor 180 and execute the same commands. In addition, the touch-sensitive surface 131 can be implemented in various types such as resistive, capacitive, infrared, and surface acoustic waves. In addition to the touch-sensitive surface 131, the input unit 130 can also include other input devices 132. Specifically, other input devices 132 may include, but are not limited to, one or more of a physical keyboard, function keys (such as volume control buttons, switch buttons, etc.), trackballs, mice, joysticks, and the like.

The display unit 140 can be used to display information entered by the user or information provided to the user and various graphical user interfaces of the terminal 1100, which can be composed of graphics, text, icons, video, and any combination thereof. The display unit 140 may include a display panel 141. Alternatively, the display panel 141 may be configured in the form of an LCD (Liquid Crystal Display), an OLED (Organic Light-Emitting Diode), or the like. Further, the touch-sensitive surface 131 may cover the display panel 141, and when the touch-sensitive surface 131 detects a touch operation thereon or nearby, it is sent to the processor 180 to determine the type of the touch event, and then the processor 180 provides a corresponding visual output on the display panel 141 according to the type of the touch event. Although in FIG. 11, touch-sensitive surface 131 and display panel 141 are implemented as two separate components to implement input and input functions, in some embodiments, the touch-sensitive surface 131 can be integrated with the display panel 141 for realizing input and output function.

Terminal 1000 can also include at least one type of sensor 150, such as a light sensor, motion sensor, and other sensors. Specifically, the light sensor may include an ambient light sensor and a proximity sensor, wherein the ambient light sensor may adjust the brightness of the display panel 141 according to the brightness of the ambient light, and the proximity sensor may turn off the display panel 141 and/or backlight when the terminal 1000 moves to the ear. As a kind of motion sensor, a gravity acceleration sensor can detect the magnitude of acceleration in all directions (usually three axes). When it is stationary, it can detect the magnitude and direction of gravity. It can be used to identify the gesture of the mobile phone (such as horizontal and vertical screen switching, related game, magnetometer attitude calibration), vibration recognition related functions (such as pedometer, tapping), etc.; and the terminal 1000 may also include other sensors such as gyroscope, barometer, hygrometer, thermometer, infrared sensor and the like.

The audio circuit 160, the speaker 161, and the microphone 162 can provide an audio interface between the user and the terminal 1000. The audio circuit 160 can send the converted electrical data of the received audio data to the speaker 161 for conversion to the sound signal output by the speaker 161; on the other hand, the microphone 162 converts the collected sound signal into an electrical signal by the audio circuit 160. After receiving, it is converted into audio data, and then processed by the audio data output processor 180, sent to the terminal, for example, via the RF circuit 110, or outputted to the memory 120 for further processing. The audio circuit 160 may also include an earbud jack to provide communication of the peripheral earphones with the terminal 1000.

WiFi is a short-range wireless transmission technology, and the terminal 1000 can help users to send and receive emails, browse web pages, and access streaming media through a WiFi module 170, which provides wireless broadband Internet access for users. Although FIG. 10 shows the WiFi module 170, it can be understood that it does not belong to the essential configuration of the terminal 1000, and may be omitted as needed within the scope of the essence of the invention.

The processor 180 is a control center of the terminal 1000 that connects various portions of the entire cellphone with various interfaces and lines, by running or executing software programs and/or modules stored in the memory 120, and recalling data stored in the memory 120, The various functions and processing data of the terminal 1000 are performed to perform overall monitoring of the cellphone. Optionally, the processor 180 may include one or more processing cores; preferably, the processor 180 may integrate an application processor and a modem processor, where the application processor mainly processes an operating system, a user interface, an application, and the like. The modem processor primarily handles wireless communications. It can be understood that the above modem processor may not be integrated into the processor 180.

The terminal 1000 also includes a power supply 190 (such as a battery) for powering various components. Preferably, the power supply can be logically coupled to the processor 180 through a power management system to manage functions such as charging, discharging, and power management through the power management system. The power supply 190 may also include any one or more of a DC or AC power source, a recharging system, a power failure detection circuit, a power converter or inverter, a power status indicator, and the like.

Although not shown, the terminal 1000 may further include a camera, a Bluetooth module, and the like. Specifically, in this embodiment, the display unit of the terminal 1000 is a touch screen display, and the terminal 1100 further includes a memory, and one or more programs, wherein said one or more programs are stored in the memory and configured such that one or more processors are able to execute one or more programs including instructions for performing the following operations:

a first sending module for sending the local terminal type to the server, so that the server is able to determine a target transcoding mode corresponding to the terminal type based on the pre-stored corresponding relation between the terminal type and transcoding mode when it is detected that the account identifier of the account logged in locally is located in a preset position of a list of speaking sequence during the in-sequence live streaming; and a second sending module for obtaining live streaming data and sending the live streaming data to the server when a start streaming triggering event is detected, so that the server transcodes the live streaming data according to the target transcoding mode, and sends the transcoded live streaming data to the viewer terminal.

Optionally, the second sending module is configured for:
receiving and displaying a start streaming prompt sent by the server, and when a start streaming instruction input by the user is received, obtaining live streaming data, and sending the live streaming data to the server.

In the embodiments of the present invention, during the in-sequence live streaming, the terminal type of the streamer terminal sent by the streamer terminal is received, and the target transcoding corresponding to the terminal type of the streamer terminal is determined according to the pre-stored corresponding relation between the terminal type and the transcoding mode. The live streaming data sent by the streamer terminal is received, the live streaming data is transcoded according to the target transcoding mode, and the transcoded live streaming data is sent to the viewer terminal of the live streaming room to which the streamer terminal belongs. In this way, even if there is no computer around the streamer, he can use the mobile terminal such as mobile phone or tablet to conduct live streaming.

A person skilled in the art may understand that all or part of the steps of implementing the above embodiments may be completed by hardware, or may be instructed by a program to execute related hardware, and the program may be stored in a computer readable storage medium. The storage medium mentioned above may be a read only memory, a magnetic disk or an optical disk, etc.

The above are only the preferred embodiments of the present invention, and are not intended to limit the present invention. Any modifications, equivalents, improvements, etc., which are within the spirit and scope of the present invention, should be included in the protection of the present invention.

The invention claimed is:

1. A method for in-sequence live streaming, comprising:
receiving a terminal type of a streamer terminal sent by the streamer terminal during the in-sequence live streaming, said terminal type being sent to a server when it is detected that an account identifier of an account logged in locally is located in a preset position of a list of speaking sequence during the in-sequence live streaming;
determining a target transcoding mode corresponding to the terminal type of the streamer terminal according to a pre-stored corresponding relation between the terminal type and the transcoding mode; and
receiving live streaming data sent by the streamer terminal, transcoding the live streaming data according to the target transcoding mode, and sending the transcoded live streaming data to at least one viewer terminal of a live streaming room to which the streamer terminal belongs; wherein
sending the transcoded live streaming data to a viewer terminal comprises:
obtaining terminal type of each viewer terminal of the live streaming room to which the streamer terminal belongs; and
performing image cropping on the transcoded live streaming data based on display ratio of the terminal type of the viewer terminal and display ratio of the terminal type of the streamer terminal, and sending the cropped live streaming data to the viewer terminal;
before receiving the live streaming data sent by the streamer terminal, the method further comprises:
obtaining the account identifier of the account currently logged in the streamer terminal; and
sending a start streaming prompt to the streamer terminal if it is detected that a target authentication information corresponding to the account identifier and a target terminal type is stored locally, so that after receiving and displaying a start streaming prompt sent by the server, the streamer terminal displays a start streaming prompt window, and when receiving streaming instruction input by a user by clicking a streaming button in the start streaming prompt window, obtaining the live streaming data, and sending the live streaming data to the server.

2. A method for in-sequence live streaming, comprising:
sending the local terminal type to the server when it is detected that the account identifier of the account logged in locally is located in a preset position of a list of speaking sequence during the in-sequence live streaming, so that the server is able to determine a target transcoding mode corresponding to the terminal type based on a pre-stored corresponding relation between the terminal type and transcoding mode; and
obtaining live streaming data and sending the live streaming data to the server when a start streaming triggering event is detected, so that the server transcodes the live streaming data according to the target transcoding mode, and sends the transcoded live streaming data to the viewer terminal, wherein sending the transcoded live streaming data to a viewer terminal comprises:
obtaining terminal type of each viewer terminal of the live streaming room to which the streamer terminal belongs; and
performing image cropping on the transcoded live streaming data based on display ratio of the terminal type of the viewer terminal and display ratio of the terminal type of the streamer terminal, and sending the cropped live streaming data to the viewer terminal;
obtaining live streaming data and sending the live streaming data to the server when a start streaming triggering event is detected comprises:
after receiving and displaying a start streaming prompt sent by the server, the streamer terminal displays a start streaming prompt window, and when receiving streaming instruction input by a user by clicking a streaming button in the start streaming prompt window, obtaining the live streaming data, and sending the live streaming data to the server;
the start streaming prompt is sent when the server obtains the account identification of the account currently logged in by the streamer terminal and detects that the target authentication information corresponding to the account identification and the target terminal type is stored locally.

3. A server, comprising:
a receiving module for receiving a terminal type of a streamer terminal sent by the streamer terminal during the in-sequence live streaming, said terminal type being sent to the server when it is detected that an account identifier of an account logged in locally is located in a preset position of a list of speaking sequence during the in-sequence live streaming;
a determination module for determining a target transcoding mode corresponding to the terminal type of the streamer terminal according to a pre-stored corresponding relation between the terminal type and the transcoding mode;
a sending module for receiving live streaming data sent by the streamer terminal, transcoding the live streaming data according to the target transcoding mode, and sending a transcoded live streaming data to at least one viewer terminal of a live streaming room to which the streamer terminal belongs;
obtaining terminal type of each viewer terminal of the live streaming room to which the streamer terminal belongs; and performing image cropping on the transcoded live streaming data based on display ratio of the terminal type of the viewer terminal and display ratio of the terminal type of the streamer terminal, and sending the cropped live streaming data to the viewer terminal;

the server further comprises:

an obtaining module for obtaining an account identifier of an account currently logged in the streamer terminal; and a detection module for sending a start streaming prompt to the streamer terminal if it is detected that a target authentication information corresponding to the account identifier and a target terminal type is stored locally, so that after receiving and displaying a start streaming prompt sent by the server, the streamer terminal displays a start streaming prompt window, and when receiving streaming instruction input by a user by clicking a streaming button in the start streaming prompt window, obtaining the live streaming data, and sending the live streaming data to the server.

4. A streamer terminal, comprising:

a first sending module for sending a local terminal type to a server when it is detected that an account identifier of an account logged in locally is located in a preset position of a list of speaking sequence during an in-sequence live streaming, so that the server is able to determine a target transcoding mode corresponding to the terminal type based on a pre-stored corresponding relation between the terminal type and transcoding mode; and a second sending module for obtaining live streaming data and sending the live streaming data to the server when a start streaming triggering event is detected, so that the server transcodes the live streaming data according to the target transcoding mode, and sends a transcoded live streaming data to the viewer terminal;

the transcoded live streaming data is sent to the viewer terminal, comprising:

obtaining terminal type of each viewer terminal of the live streaming room to which the streamer terminal belongs; and performing image cropping on the transcoded live streaming data based on display ratio of the terminal type of the viewer terminal and display ratio of the terminal type of the streamer terminal, and sending the cropped live streaming data to the viewer terminal;

the second sending module is configured for:

after receiving and displaying a start streaming prompt sent by the server, the streamer terminal displays a start streaming prompt window, and when receiving streaming instruction input by a user by clicking a streaming button in the start streaming prompt window, obtaining the live streaming data, and sending the live streaming data to the server;

the start streaming prompt is sent when the server obtains the account identification of the account currently logged in by the streamer terminal and detects that the target authentication information corresponding to the account identification and the target terminal type is stored locally.

5. A system for in-sequence live streaming, comprising a server and a streamer terminal, wherein the server for receiving a terminal type of a streamer terminal sent by the streamer terminal during the in-sequence live streaming; and determining a target transcoding mode corresponding to the terminal type based on a pre-stored corresponding relation between the terminal type and transcoding mode; and receiving live streaming data sent by the streamer terminal, transcoding the live streaming data according to the target transcoding mode, and sending a transcoded live streaming data to at least one viewer terminal of a live streaming room to which the streamer terminal belongs before receiving the live streaming data sent by the streamer terminal, the method further comprises:

obtaining an account identifier of an account currently logged in the streamer terminal; and sending a start streaming prompt to the streamer terminal if it is detected that a target authentication information corresponding to the account identifier and a target terminal type is stored locally;

the streamer terminal used during the in-sequence live streaming for sending a local terminal type to the server when it is detected that an account identifier of an account logged in locally is located in a preset position of a list of speaking sequence during an in-sequence live streaming; and obtaining live streaming data and sending the live streaming data to the server when a start streaming triggering event is detected;

sending the transcoded live streaming data to at least one viewer terminal of a live streaming room to which the streamer terminal belongs comprises:

obtaining terminal type of each viewer terminal of the live streaming room to which the streamer terminal belongs; and performing image cropping on the transcoded live streaming data based on display ratio of the terminal type of the viewer terminal and display ratio of the terminal type of the streamer terminal, and sending the cropped live streaming data to the viewer terminal;

wherein, obtaining live streaming data and sending the live streaming data to the server when a start streaming triggering event is detected comprises:

after receiving and displaying a start streaming prompt sent by the server, and when a start streaming instruction input by the user is received, displaying a start streaming prompt window, and when receiving streaming instruction input by a user by clicking a streaming button in the start streaming prompt window, obtaining the live streaming data, and sending the live streaming data to the server.

* * * * *